United States Patent [19]
Geiser

[11] Patent Number: 5,459,488
[45] Date of Patent: Oct. 17, 1995

[54] GRAPHICAL USER INTERFACE WITH FISHEYE ADAPTATION PRINCIPLE

[75] Inventor: Georg Geiser, Karlsruhe, Germany

[73] Assignee: Robert Bosch GmbH, Stuttgart, Germany

[21] Appl. No.: 976,999

[22] PCT Filed: Jul. 18, 1991

[86] PCT No.: PCT/EP91/01355

§ 371 Date: Jan. 19, 1993

§ 102(e) Date: Jan. 19, 1993

[87] PCT Pub. No.: WO92/01983

PCT Pub. Date: Feb. 6, 1992

[30] Foreign Application Priority Data

Jul. 21, 1990 [DE] Germany .......................... 40 23 318.9

[51] Int. Cl.⁶ ..................................... G09G 3/02
[52] U.S. Cl. .......................... 345/173; 345/156; 395/160
[58] Field of Search ................... 395/155, 160; 340/712, 706; 178/18; 345/173, 156

[56] References Cited

U.S. PATENT DOCUMENTS 4,763,117  8/1988  Blattner .................................. 345/156

FOREIGN PATENT DOCUMENTS

0330944A2  9/1989  European Pat. Off. .

OTHER PUBLICATIONS

"Fundamentals of Interactive Computer Graphics", Jul. 1984, pp. 220 to 228.
"Microsoft Windows", 1990–1993, pp. 1 to 7.
George W. Furnas, "Generalized Fisheye Views" in *Human Factors in Computing Systems, vol. III of Proceedings of the CHI '86 Conference,* Boston, Massachusetts, USA, Assoc'n for Computing Machinery, Apr. 13–17, 1986, pp. 16–23. ACM publication No. 089791–180–6/86/0400.

*Primary Examiner*—Curtis Kuntz
*Assistant Examiner*—Minsun Oh
*Attorney, Agent, or Firm*—Frishauf, Holtz, Goodman, Langer & Chick

[57] ABSTRACT

The invention relates to a method for carrying out a variable dialog with technical equipment that has a display and an input, such as a television screen with a touch keyboard. According to the invention, the dialog is to be carried out by means of the fisheye principle, in which, by means of one or more multi-stage input elements, the extent or scope of the functions that are shown and accessible in parallel, by means of a threshold value indicator, is adjustable by means of an input operation.

5 Claims, 11 Drawing Sheets

DIAL "0" FIRST TO CALL OUT

SKILL LEVEL

GRAPHICAL USER INTERFACE WITH FISHEYE ADAPTATION PRINCIPLE

The invention relates to a method and an apparatus for handling the dialog of the user with technical equipment, such as a computerized a telecommunications terminal device, a navigation system in the motor vehicle, or a video cassette recorder VCR, by which adaptation of the dialog to user needs (previous experience, or practice, for instance). Dialog is the term used here for the mutual exchange of information between the user and technical equipment. Technical equipment means a gadget whose functional range is so extensive and complex that its use poses problems, at least for some users.

BACKGROUND OF THE INVENTION

The user-friendliness of some technical equipment is determined by how the graphical user interface (GUI) or the dialog between the user and the equipment is designed. Users of technical equipment differ from one another in many aspects: their prior experience, capabilities, practice, and preferences. Even one and the same user has different traits, when he is interacting with equipment at various times; for instance, a skilled user may revert to being an inexperienced one after being out of practice for some time.

It is known that inexperienced users require a different form of dialog design from what skilled users need. In principle, the general outline, of the demands for dialog design for the two classes of users, is also known. Inexperienced users need step-by-step guidance (serial dialog); moreover, they must usually be taught what the range of functions of the equipment and the tasks it can perform look like., Skilled users, conversely, want fast access to the range of functions they are familiar with (parallel dialog). Dialog by menus, supplemented with tutorial and help functions, is therefore a suitable form of dialog for inexperienced users, while the needs of the skilled user are better met by function-key dialog.

No form of dialog exists that meets the demands of both the inexperienced and the skilled user. It follows that the dialog design must be flexible, rather than rigid, adapting the dialog to the user. Two options for adapting dialog to the needs of the user are known: adaptable and adaptive dialogs. In adaptable dialog, the user influences the form of dialog by his own decisions, in order to adapt it to his needs. Dialog presets that become operative when the equipment is turned on (known as defaults) can support the user. One known method is called the user profile, which permits the user to set the font, font size, and window dimensions, for instance. Conversely, in adaptive dialog, this adaptation proceeds automatically, without any action on the part of the user. The prerequisite for this latter form of adaptation is that knowledge about the user be available in the technical equipment. The design of adaptive dialogs is still being researched, and will not be considered hereinafter.

For one aspect of the field of man-machine dialog, the display of information on a screen, Furnas, in 1986, proposed an adaptable display form with fisheye organization. The purpose of fisheye organization is to seek a balanced relationship between displaying local detail and global context, on the same screen, using a single form of display. By analogy with an extreme wide-angle lens (or "fisheye lens"), a more-detailed display is provided in the center of observation (for instance, around the fixation point at a given time), yet nevertheless imaging of the surrounding "world" is not omitted: fewer and fewer details are shown as the distance from the center increases.

For formal description of a fisheye organization, FURNAS 1986 defines a function that fixes and defines the relevance of each element of a two-dimensional information structure. Based on this relevance, the decision is then made as to whether an element will be displayed. The relevance is composed of two components, which are the a priori weighting of importance and the weighting of distance. The additive form of the relevance function is as follows:

$$R(x, y; x_o, y_o) = W(x, y) - D(x - x_o, y - y_o) \quad (1)$$

where $R(x, y; x_o, y_o)$ is the relevance function, which indicates the degree of relevance that a point $(x, y)$ has if the instantaneous fixation point is $(x_o, y_o)$. $W(x, y)$ is the a priori importance of the point $(x, y)$, and $D(x - x_o, y - y_o)$ indicates how the importance of the point $(x, y)$ decreases with increasing distance from the fixation point $(x_o, y_o)$. The fixation point is the term used here for the center of the observation area, in the figurative sense as well; in the same way, the distance weighting can be done not only on the basis of geometric distances but also on the basis of logical distance. This definition of the relevance requires importance and distance weighting only on the level of the ordinal scale.

For display on an optical indicator, a threshold k is introduced, and only those points are displayed for which the following is true:

$$R(x, y; x_o, y_o) > k \quad (2)$$

The fisheye principle will be described below in terms of a tree structure. In a tree structure, the distance weighting $D(x, x_o)$ at a given fixation point $x_o$ is expressed as a distance $d(x, x_o)$ between $x$ and $x_o$ in the tree. The a priori importance weighting $W(x)$ is the distance from the root w of the tree structure $-d(x, w)$. The relevance function attained is $$R(x; x_o) = -d(x, w) - d(x, x_o) \quad (3)$$

By selection of the threshold k, fisheye displays of varying size are obtained. It is accordingly possible, by means of the threshold k, to influence the scope of the information selected from the tree structure. The scope of the selected information will hereinafter be called the viewing field size—in the figurative sense as well. This selection is made as a function of the a priori importance and of the distance from the instantaneous fixation point. Besides the threshold k, there is a second option for adapting the array of information available, by selection of the fixation point.

With the fisheye organization of the information, a way is indeed shown for the adaptive display of information, but methods for adaptive design of the entire dialog, which includes not only the display but also the input of information by the user, are lacking. A further important requirement is that the transitions, between dialogs that can be adapted to the distinct forms, not be abrupt but rather smooth or at least graduated, in order to support the user in his gradual change, for instance from being inexperienced to becoming a skilled user.

BRIEF FIGURE DESCRIPTION

DESCRIPTION OF THE INVENTION

According to the invention, a method is proposed and a conversion to an apparatus is recited, by which the realization of an adaptable dialog with a graduated transition between specialized dialog variants is made possible. The basis of this proposal is the above-described "fisheye principle" for displaying information.

The functional array of technical equipment can be represented as a tree structure. The fisheye principle proposed for displaying information can therefore be used in order to develop a user-controlled method and an apparatus for adapting the dialog. The user has two degrees of freedom for adaptation: the scope of the functions offered and accessible in parallel (viewing field expansion), and the location of the instantaneous focus of interest (fixation point). The location of the fixation point can be placed by default at the region that arises most often during use. A further type of default is the selection of the highest possible value of the threshold $k$,, so as to offer only the particular function at which the fixation point is aimed. In this way, the needs of the unskilled user are taken into account, because he encounters only a very simple dialog design. For later adaptation of the dialog to his needs, the user requires input elements for the fixation point and for the threshold $k$.

Figure 1:
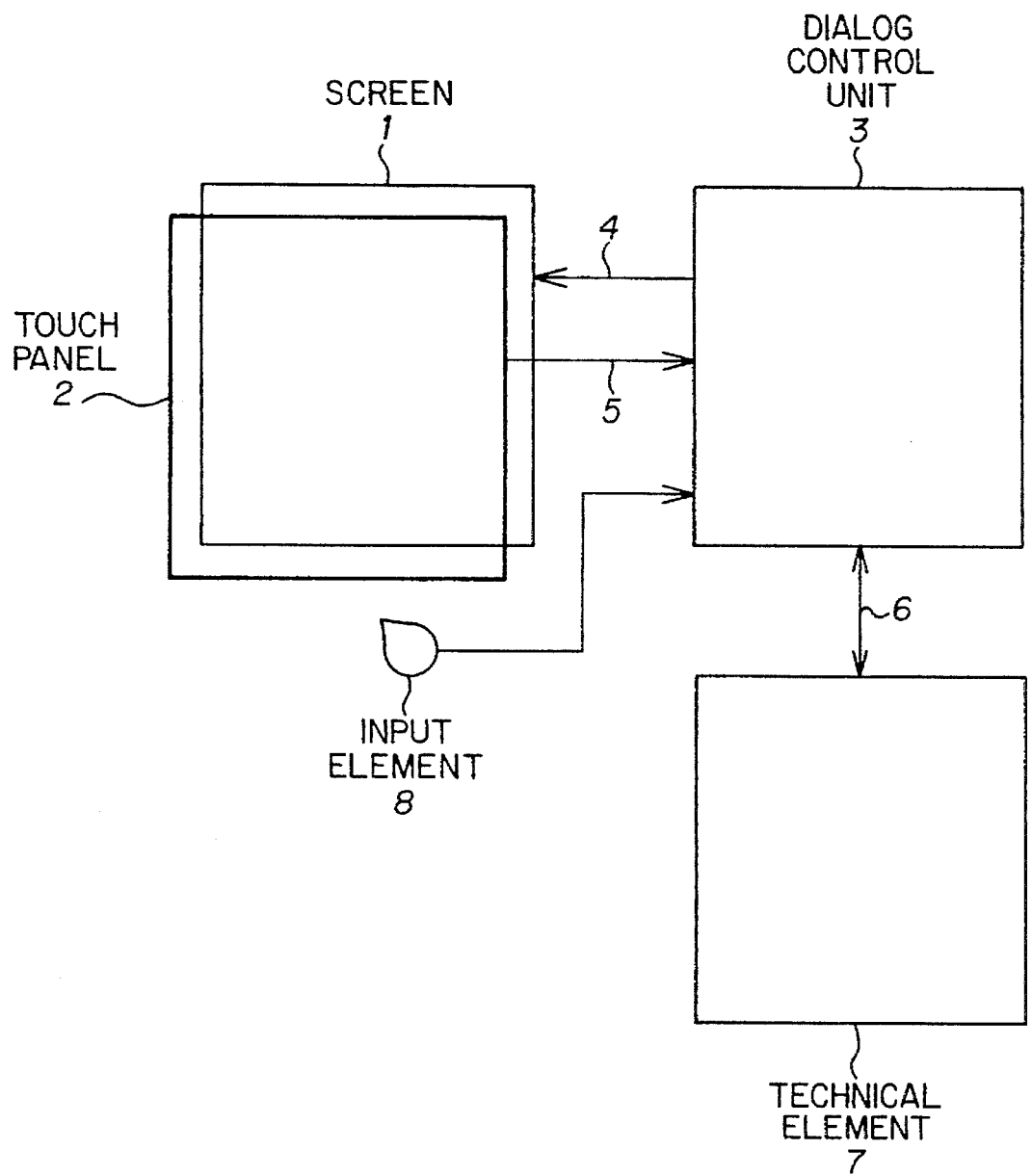
FIG. 1 is a schematic diagram of the touch input unit, the control unit, and the controlled gadget with which the other units interact.

FIG. 1 shows the block circuit diagram of the adaptable dialog system. On the screen 1, the functions are shown with the associated touch fields that can be activated with touch input 2. The dialog control unit 3 processes the information to be displayed 4 and the information entered 5. It also controls the exchange 6 of information with the technical equipment 7. With the input element 8, by varying the threshold $k$, the user indicates the relative size of the viewing field and thus selects the scope of the array of functions released for display by the dialog control unit 3.

ADVANTAGES OF THE INVENTION

The user has the option of determining his wishes in terms of the scope of functions that are offered and accessible in parallel. For the unskilled user, easier entry into using equipment is provided at the onset of the dialog by first assigning default settings for frequently needed basic functions. Blanking out functions that are not relevant, as a function of their a priori importance and their distance from the instantaneous focus of interest, simplifies the dialog.

A further advantage of blanking out functions is that this creates space on the display for information that teaches the unskilled user concepts he does not yet know for using functions, and offers him help in using them. The development toward a user as his skill increases is favored by the fact that the user can incorporate additional functions by a graduated increase in the size of the viewing field. The skilled user has the advantage that selecting a large viewing field gives him optional access to a parallel array of functions. On the other hand, if he gets out of practice, he can return to using the narrowing, and graduated widening, of the viewing field. A separate input element may be provided for selecting the initial fixation point, and with it the user can determine a fixation point that he would like to encounter when he begins using a piece of equipment. In that case, though, the user must log on by name.

EXEMPLARY EMBODIMENT

Figure 2A:
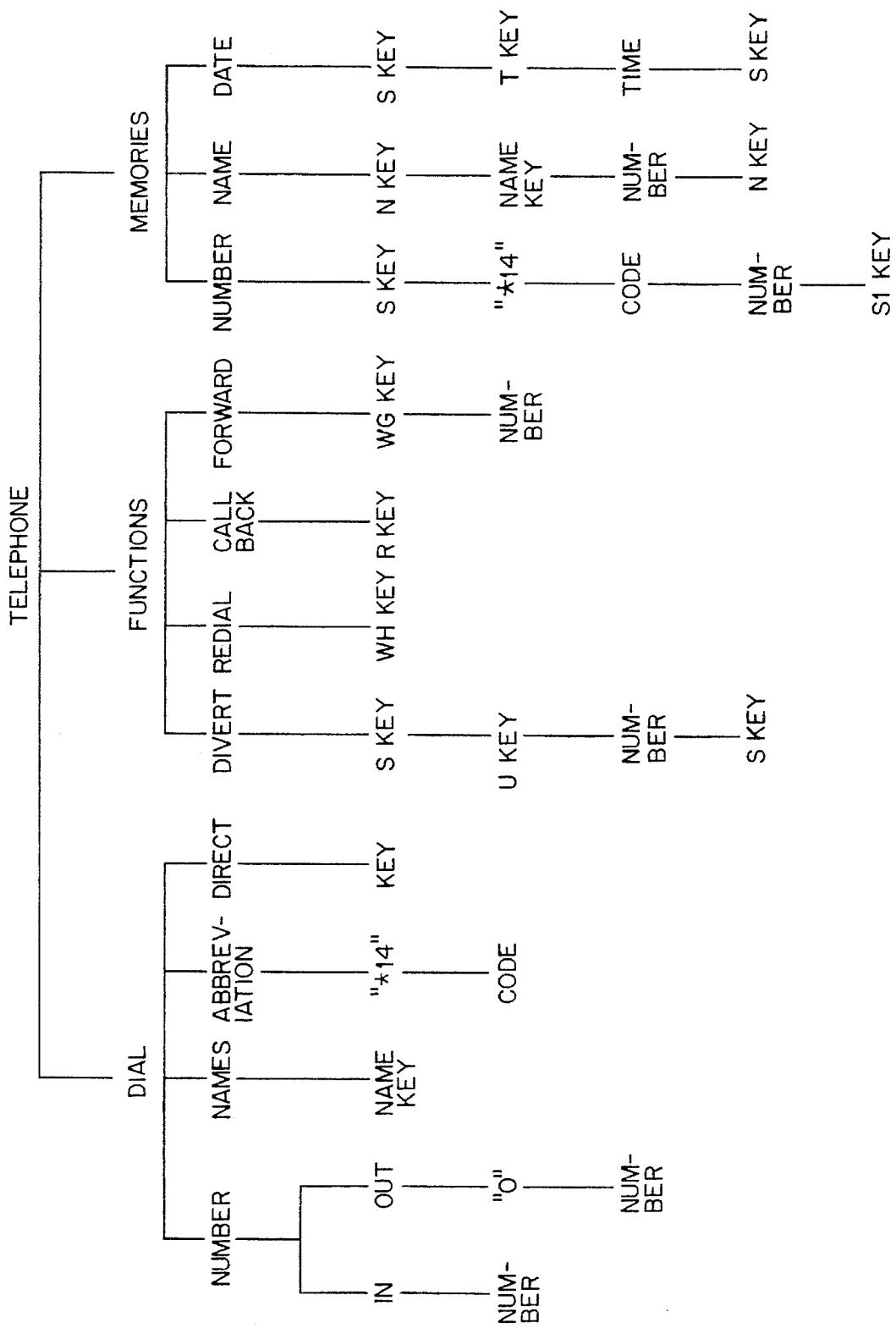
FIGS. 2a–2g are tree diagrams schematically illustrating the functions available in 7 respective embodiments of the user interface of the invention.
Figure 2B:
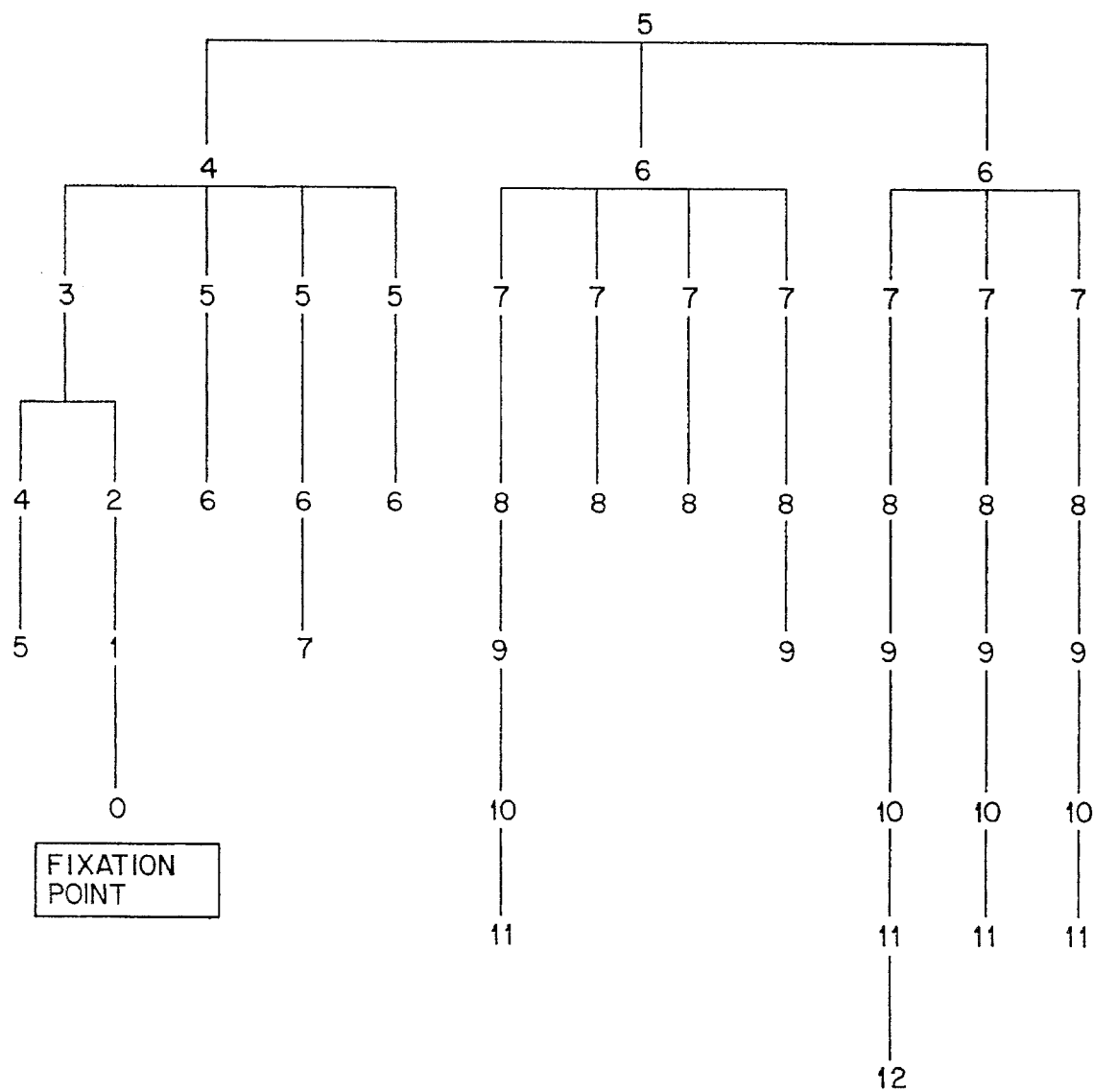
Figure 2C:
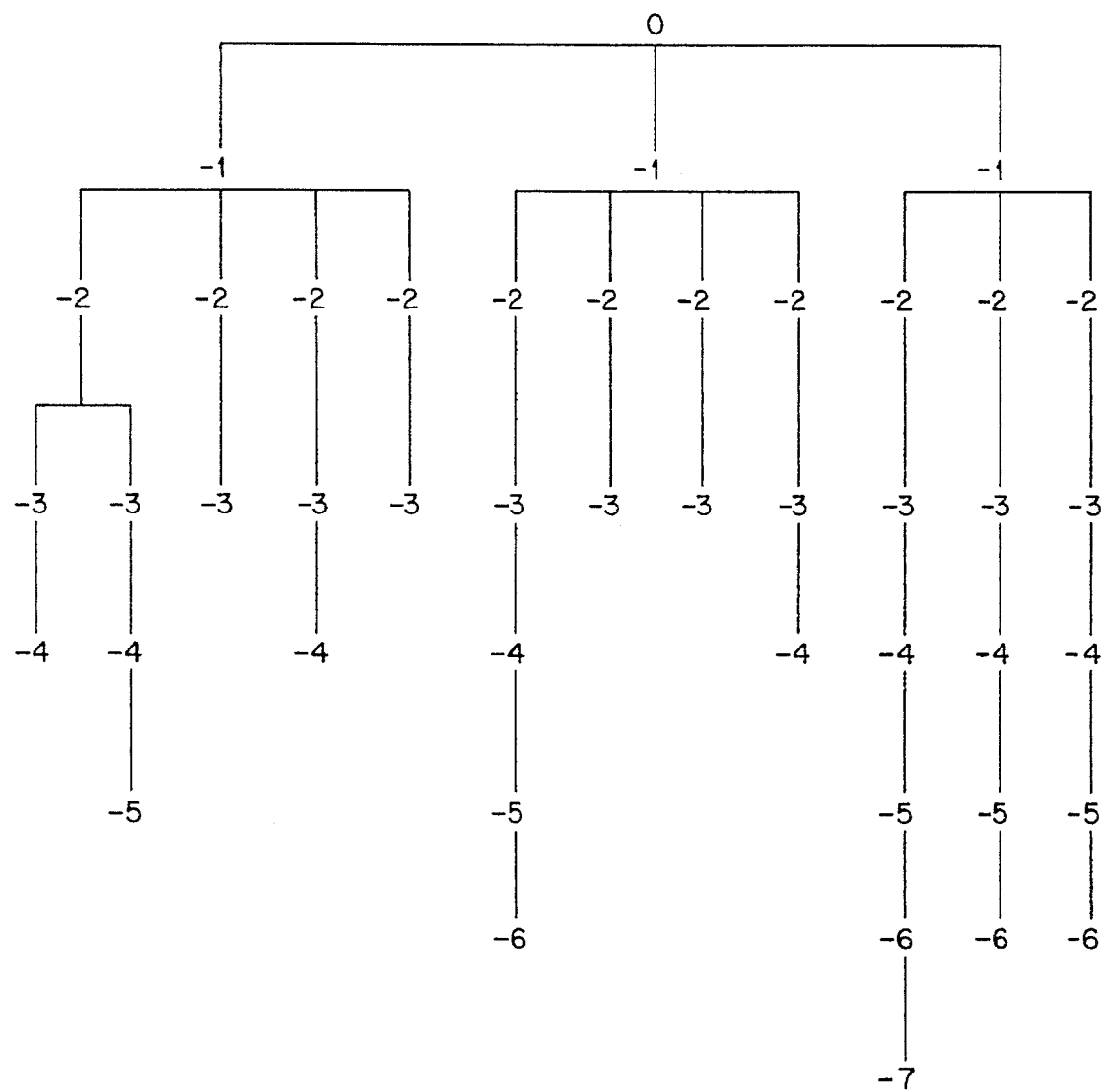
Figure 2D:
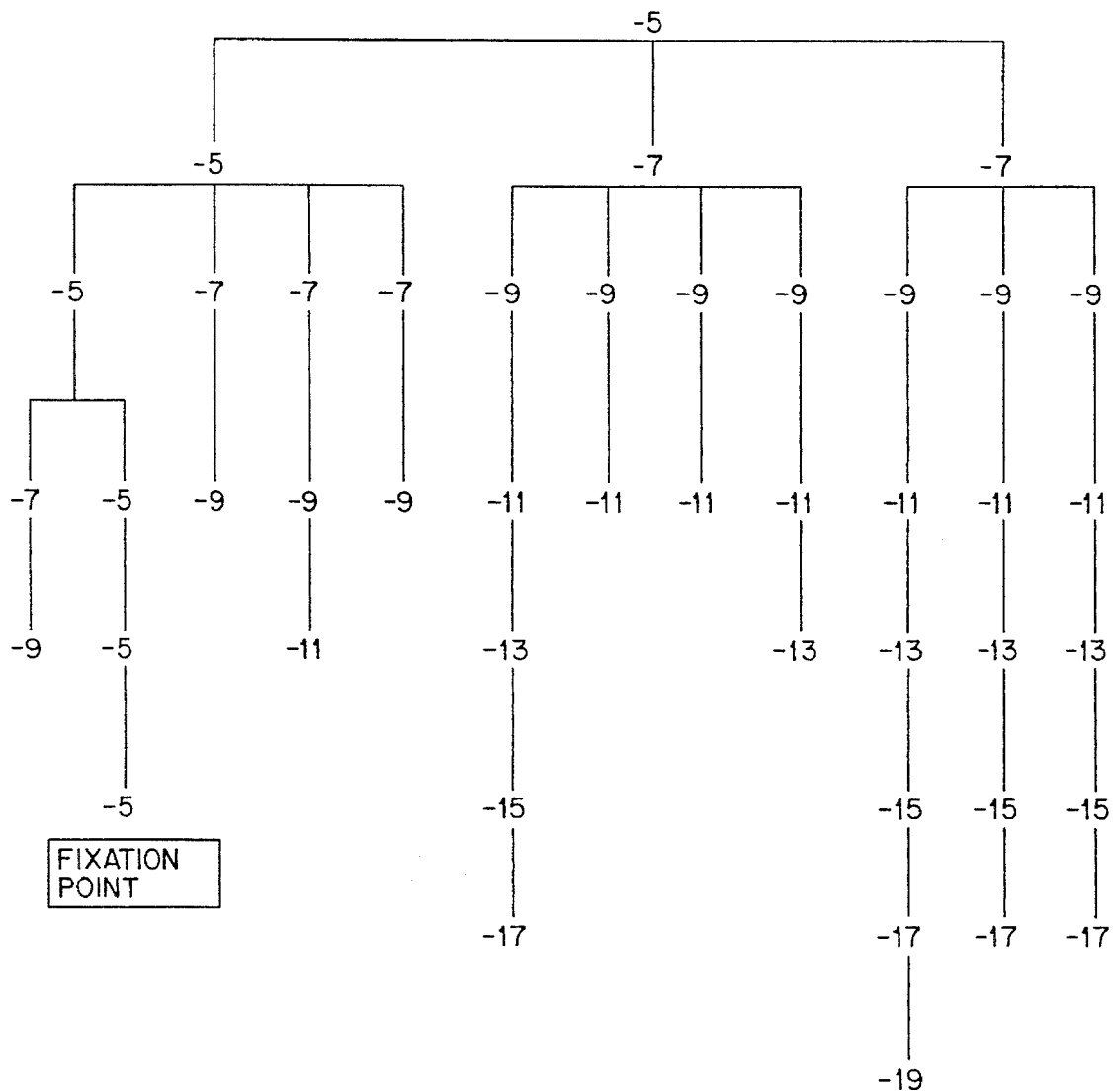
Figure 2E:
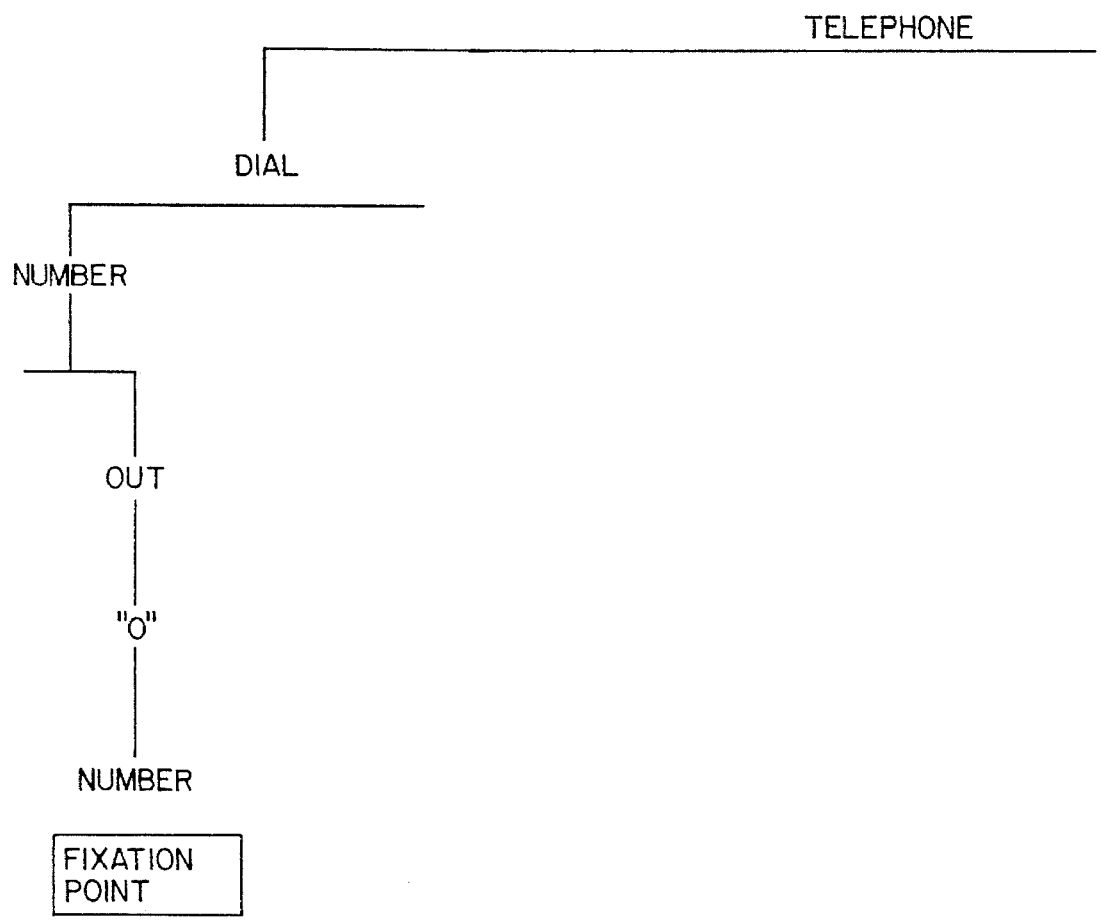
Figure 2F:
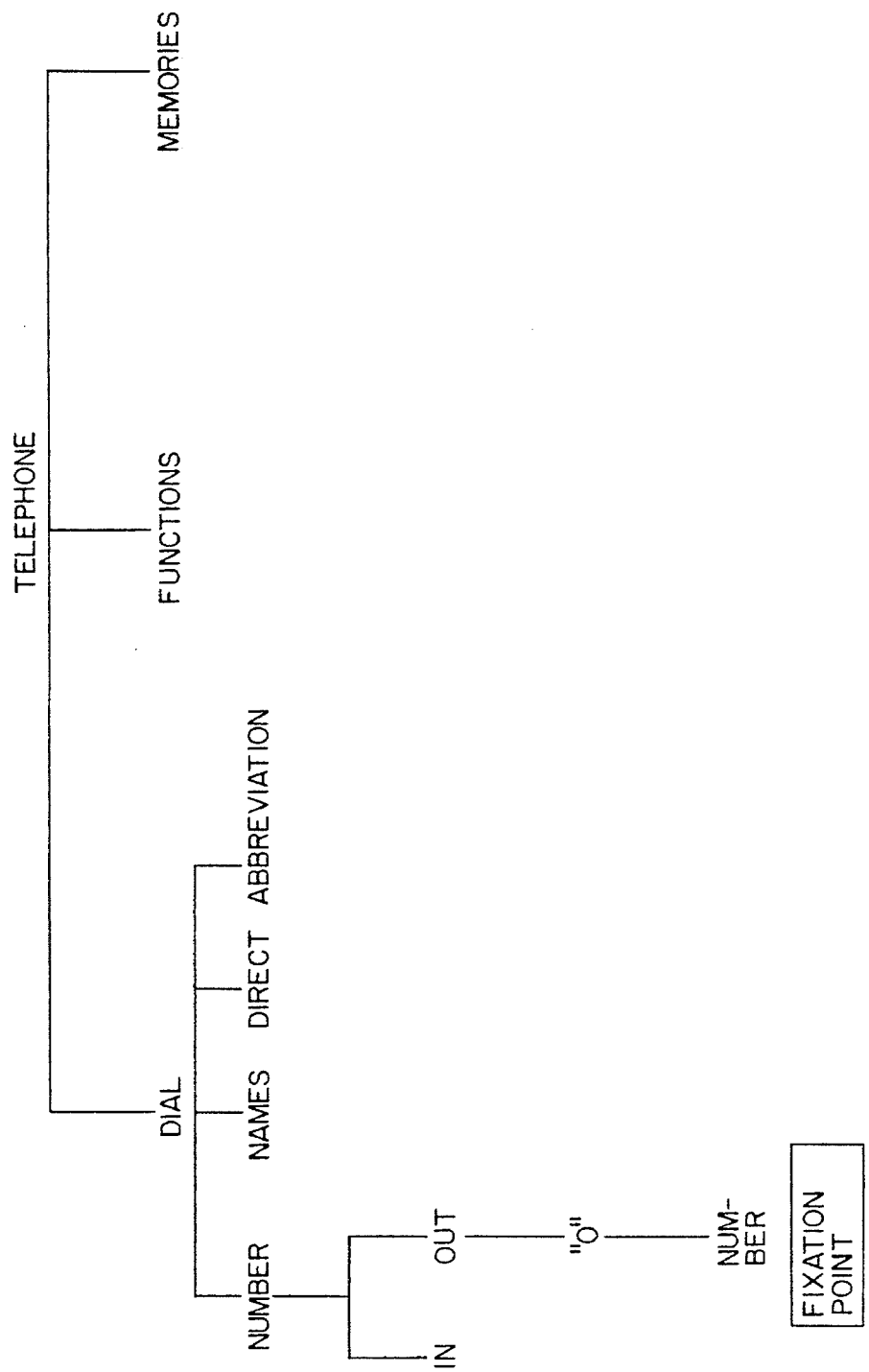
Figure 2G:
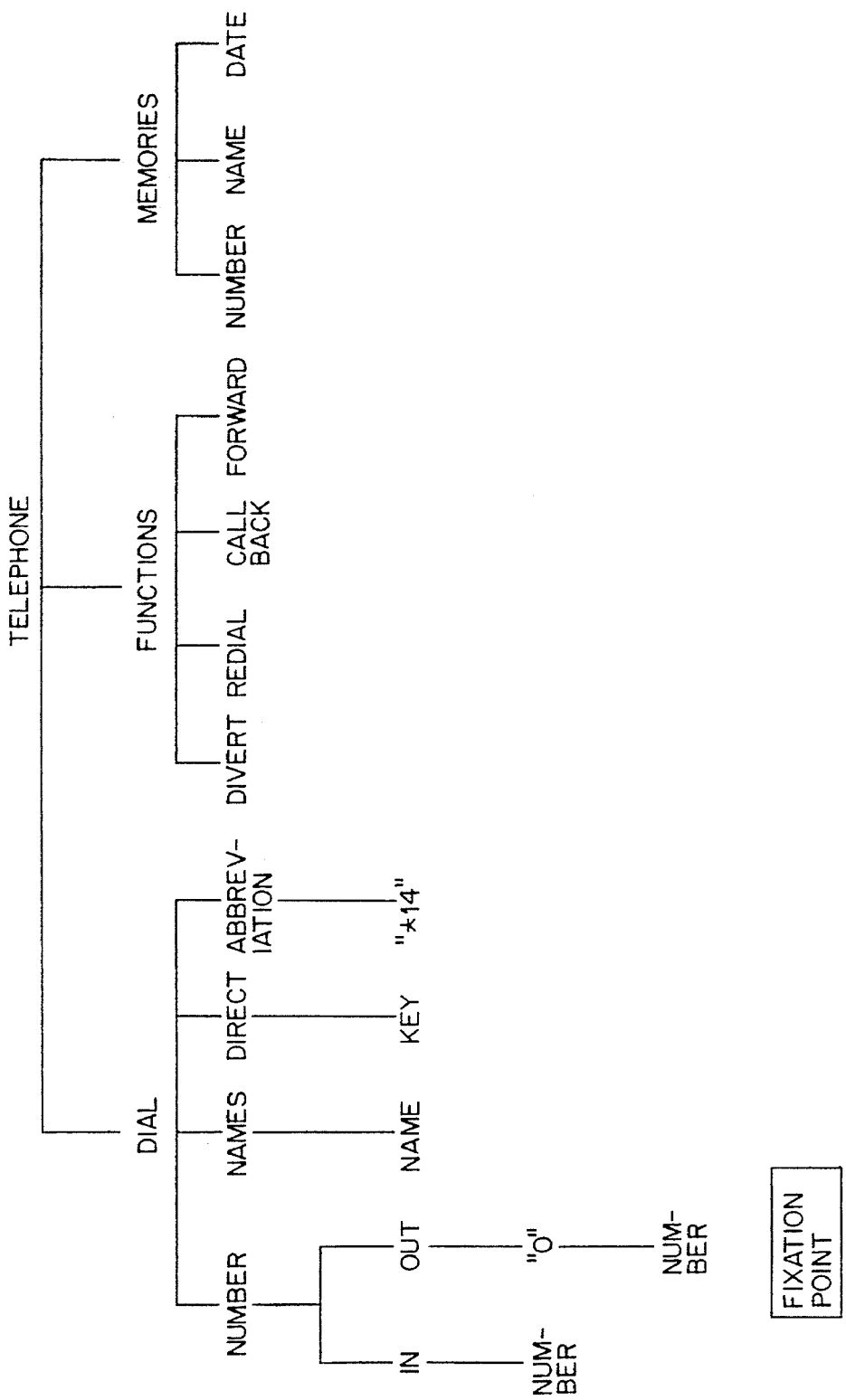

As an exemplary embodiment, dialog with a telephone will be considered below. FIG. 2a shows the dialog tree. Also, the number selected to dial out will be assumed to be the fixed fixation point. FIG. 2b shows the distance weighting and FIG. 2c the importance weighting. FIG. 2d shows the resultant relevance weighting. The fisheye views resulting by selecting the thresholds $k=-6, -8$ and $-10$ are shown in FIGS. 2e–g.

Figure 3A:
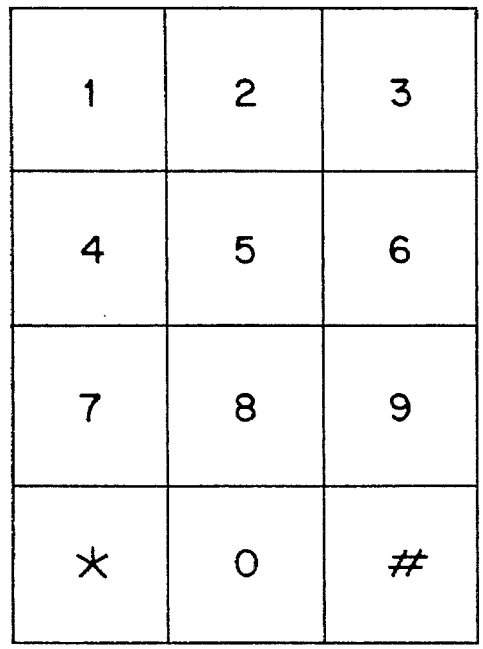
FIGS. 3a, 3b, and 3c illustrate three embodiments of numeric keypad devices with a "degree-of-difficulty" adjustment knob.
Figure 3A:
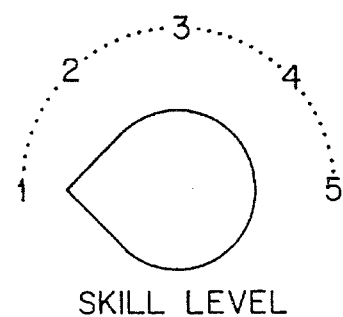
Figure 3B:
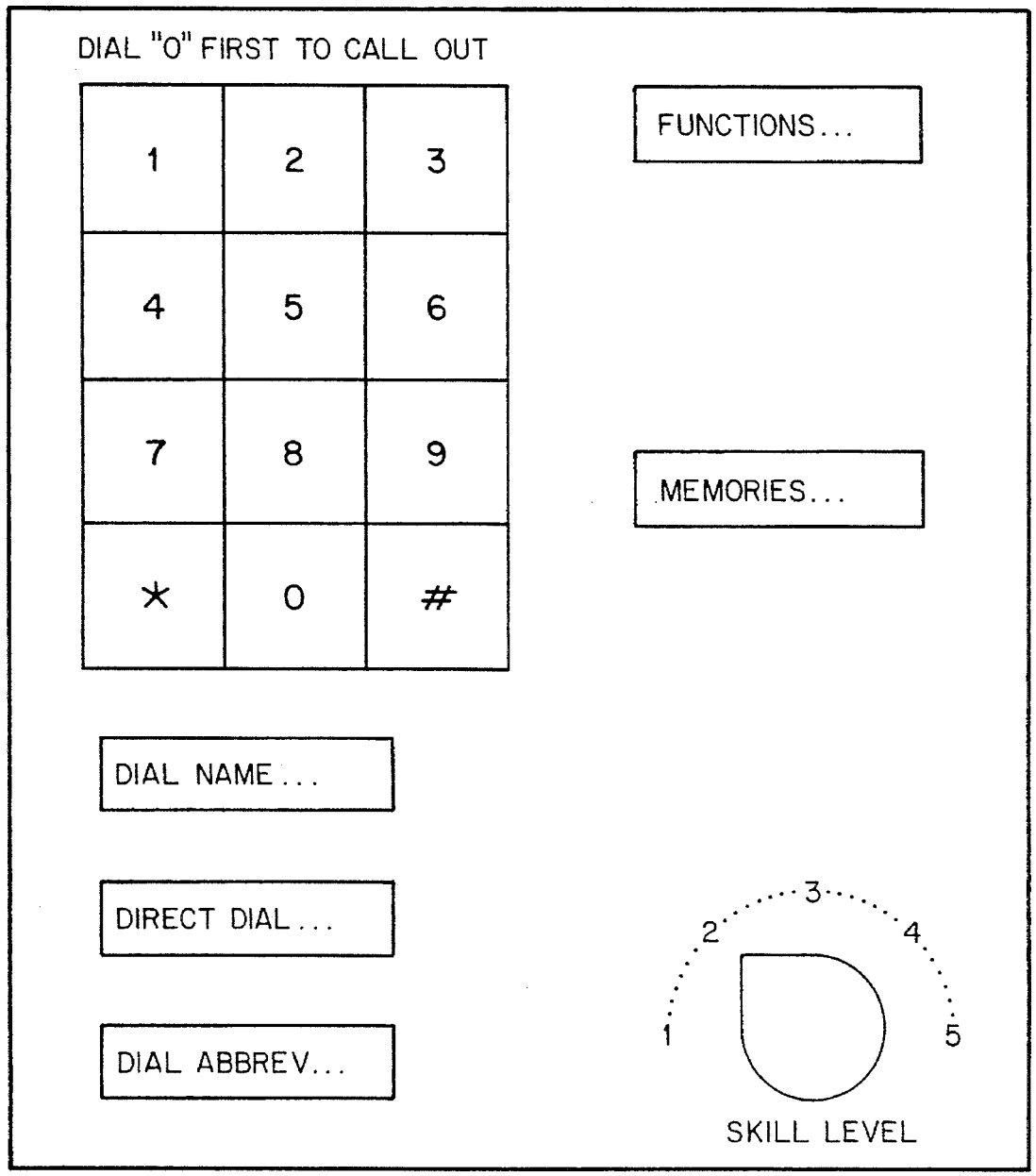
Figure 3C:
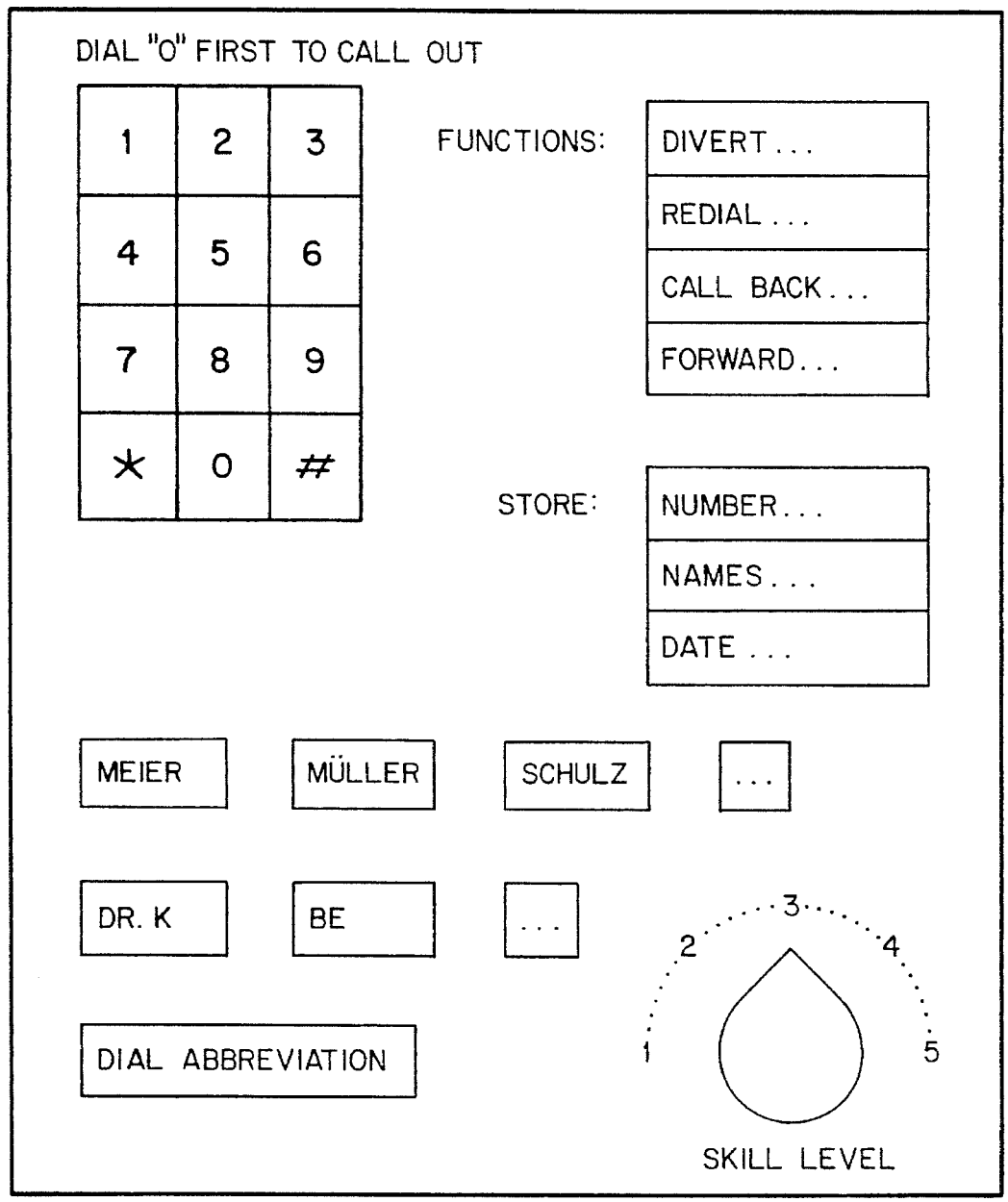

FIGS. 3a–c show the conversion of these views into an adaptable dialog. The prerequisites for realizing the adaptable dialog, taking the example of FIGS. 3a–c, are a flexible display, such as a screen, and a flexible input, such as a touch input. The gridded fields represent input: elements, such as touch fields on a touch screen. The term "skill level" was chosen as the name for the input element for changing the size of the viewing field. The switchover among these dialog views is done with this input element. A first option for realizing the input are programmable keys, whose current assigned name is shown on the screen. The fixation point shifts as function is selected. Storage of a special fixation point in memory for later reuse of the equipment may be done with a separate input element, not shown.

Literature

G. W. Furnas:

"Generalized Fisheye Views" in
*Human Factors in Computing Systems, Vol. III of Proceedings of the CHI '86 Conference*, Boston, Mass., USA, Apr. 13–17, 1986, pages 16–23.

I claim:

1. A method of performing a variable dialog with a technical gadget that has a display which represents information at a plurality of points having (x, y) coordinates, and has an input element for inputting control information, comprising the steps of:

evaluating the relevance of the represented information according to the formula;

Relevance Function $R(x, y; x_o, y_o)$=Importance at Point (x, y) less Diminution D of Importance from the Position of Fixation Point $x_o$, $y_o(D(x-x_o, y-y_o))$;

specifying with the input element an amount of information to be displayed, by means of a threshold value k;

selecting by means of an input device, in an input operation, a number of information items to be displayed in parallel and functions to be .displayed and made available;

detecting a sophistication level of a user of said technical gadget; and resetting said threshold value k in accordance with said detecting step.

2. The method of claim 1, wherein the display includes a screen and said input element includes a touch screen.

3. The method of claim 1, wherein the display includes a screen and said input element includes programmable keys.

4. The method of claim 1, wherein said step of selecting the functions includes the user selecting an extent of a viewing field with a multi-stage input element to set the scope of the functions offered in parallel.

5. The method of claim 1, further including the step of the user specifying a fixation point which the user wishes to encounter at the beginning of reuse of the gadget, by means of said input element.

\* \* \* \* \*